United States Patent
Wagner et al.

(10) Patent No.: US 10,220,334 B2
(45) Date of Patent: Mar. 5, 2019

(54) FILTER ELEMENT AND METHOD FOR PRODUCING A FILTER ELEMENT

(71) Applicant: MANN+HUMMEL GMBH, Ludwigsburg (DE)

(72) Inventors: Fabian Wagner, Moeglingen (DE); Robert Hasenfratz, Waiblingen (DE); André Roesgen, Remshalden (DE); Christian Thalmann, Speyer (DE); Frank Pflueger, Sachsenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 386 days.

(21) Appl. No.: 14/323,564

(22) Filed: Jul. 3, 2014

(65) Prior Publication Data

US 2015/0033688 A1    Feb. 5, 2015

(30) Foreign Application Priority Data

Jul. 3, 2013    (DE) ................. 10 2013 011 086

(51) Int. Cl.
*B01D 29/13* (2006.01)
*B01D 29/11* (2006.01)
*B01D 46/24* (2006.01)

(52) U.S. Cl.
CPC ............. *B01D 29/13* (2013.01); *B01D 29/11* (2013.01); *B01D 46/24* (2013.01);
(Continued)

(58) Field of Classification Search
CPC .... B01D 46/24; B01D 46/2414; B01D 29/11; B01D 29/13; B01D 29/37; B01D 29/111; B01D 46/0001; B01D 2201/347
See application file for complete search history.

(56) References Cited

U.S. PATENT DOCUMENTS 3,977,797 A * 8/1976 Paterson ............... B05C 17/002
                                                                401/143
6,706,087 B1 * 3/2004 Gebler ................... B01D 29/21
                                                                277/918
(Continued)

FOREIGN PATENT DOCUMENTS

DE    202005013478 U1    1/2007
EP         0897317 A1    2/1999
(Continued)

*Primary Examiner* — Jason M Greene
(74) *Attorney, Agent, or Firm* — James Hasselbeck

(57) ABSTRACT

A filter element (10) of a filter for fluid, in particular fuel, oil, water, urea solution or air, in particular of an internal combustion engine, in particular of a motor vehicle, and a method for producing the same are described. The filter element (10) comprises a filter medium (14), which is designed as a filter medium hollow body (12) and is circumferentially closed at least with respect to an imaginary axis (16). On at least one end face, the filter medium (14) comprises an end body (20). The end body (20) comprises a closing section (28), which is sealingly connected at least to the filter medium (14). Moreover, the end body (20) has a central fluid opening (24) into which a tube-like connecting element (38) of the filter can be inserted. At least one sealing section (30) is provided on the end body (20) for circumferentially sealing the fluid opening (24) with respect to the tube-like connecting element (38). The at least one sealing section (30) is integrally connected to the closing section (28) by way of at least one flexible joining section (32).

6 Claims, 4 Drawing Sheets

(52) U.S. Cl.
CPC .... *B01D 46/2414* (2013.01); *B01D 2201/291* (2013.01); *B01D 2201/347* (2013.01); *B01D 2271/025* (2013.01); *B01D 2271/027* (2013.01); *Y10T 29/49826* (2015.01)

(56) References Cited

U.S. PATENT DOCUMENTS

2010/0084290 A1* 4/2010 Anson .................. B65D 47/243
                                                                           206/219
2012/0223008 A1    9/2012 Mbadinga-Mouanda et al.

FOREIGN PATENT DOCUMENTS

| EP | 1388360 A1 | 2/2004 |
|----|------------|--------|
| EP | 1496301 A2 | 1/2005 |

\* cited by examiner

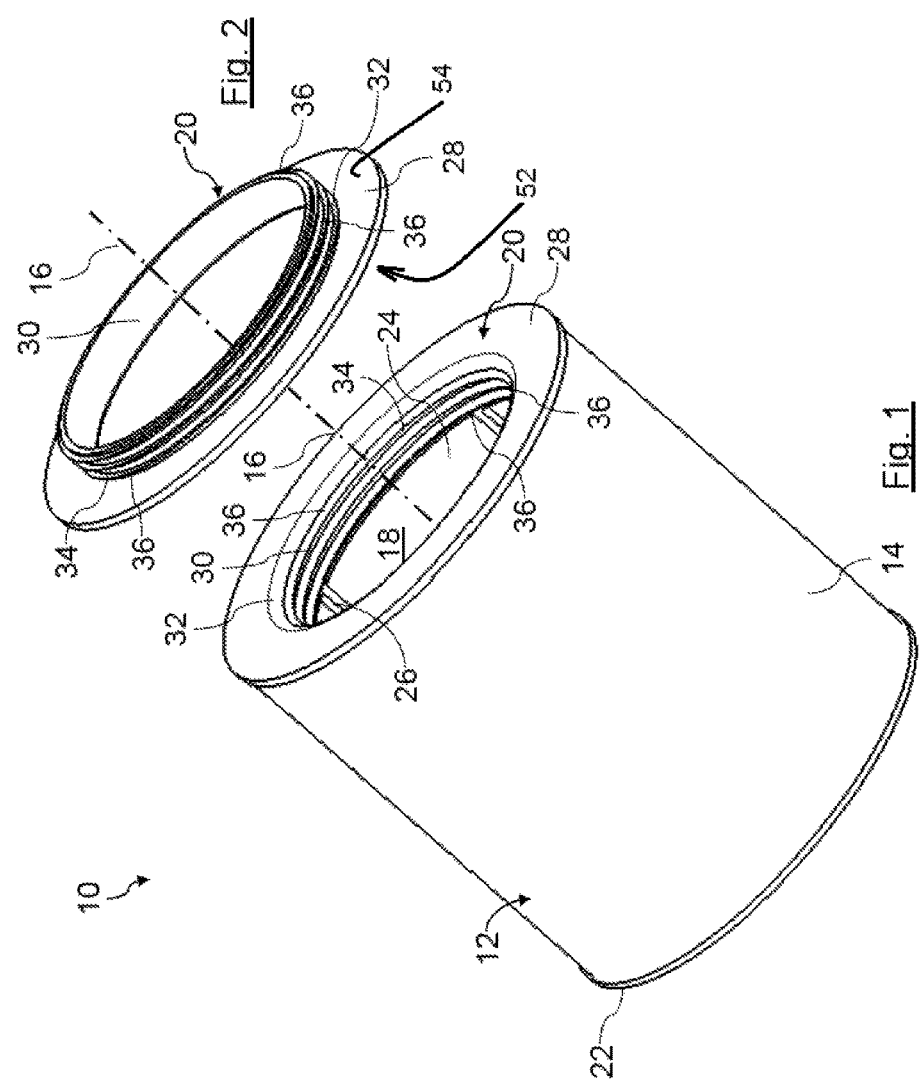

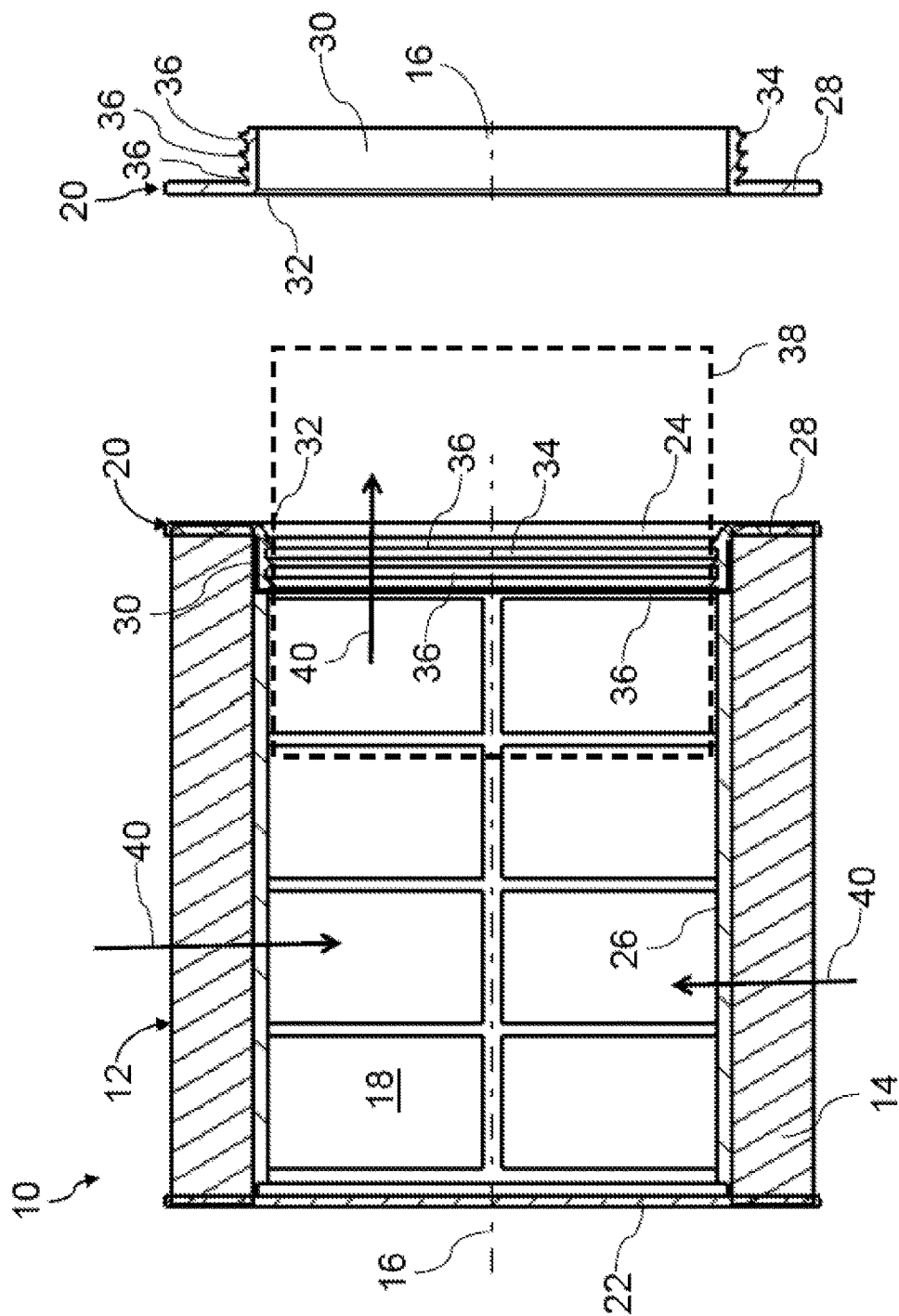

FILTER ELEMENT AND METHOD FOR PRODUCING A FILTER ELEMENT

CROSS-REFERENCE TO RELATED APPLICATION

This application claims the benefit of German patent application No. 10 2013 011 086.6 filed: Jul. 3, 2013. The entire contents of the aforesaid German patent application is incorporated herein by reference.

TECHNICAL FIELD

The invention relates to a filter element of a filter for fluid, in particular fuel, oil, water, urea solution or air, in particular of an internal combustion engine, in particular of a motor vehicle, comprising a filter medium, which is designed as a filter medium hollow body and circumferentially closed at least with respect to an imaginary axis and which on at least one end face comprises an end body, which includes a closing section that is sealingly connected at least to the filter medium and has a central fluid opening into which a tube-like connecting element of the filter can be inserted, and further comprising at least one sealing section at the end body for circumferentially sealing the fluid opening with respect to the tube-like connecting element.

The invention further relates to a method for producing a filter element, in particular a filter element according to the invention, for fluid, in particular fuel, oil, water, urea solution or air, in particular of an internal combustion engine, in particular of a motor vehicle, in which a filter medium is designed as a filter medium hollow body that is circumferentially closed with respect to an imaginary axis; in which, on at least one end face of the filter medium hollow body, an end body having a closing section is sealingly connected at least to the filter medium, the end body having a central fluid opening into which a tube-like connecting element of the filter can be inserted; and in which at least one sealing section is disposed at the end body for circumferentially sealing the fluid opening with respect to the tube-like connecting element.

BACKGROUND

A filter element and a method for producing a filter element of the type described above are known from DE 44 193 61 A1, for example. Moreover, a round filter element, which is known in the market, of an air filter for combustion air of an internal combustion engine comprises a filter bellows made of a circumferentially closed filter medium. An end plate is disposed at each of the end faces of the filter bellows and is sealingly connected to the filter medium. One of the end plates has a central air opening into which a connector of the air filter is inserted, the connector being fixed to the housing. An O-ring seal seals the air opening with respect to the connector. The O-ring seal is disposed in a corresponding receptacle on the end plate.

SUMMARY OF THE INVENTION

It is the object of the invention to create a filter element and a method for producing a filter element of the type mentioned above, in which the at least one sealing section can be implemented more easily. This object is achieved according to the invention in that the at least one sealing section is integrally connected to the closing section by way of at least one flexible joining section.

According to the invention, the end body is thus implemented as a one-piece component and comprises the closing section, the at least one joining section and the at least one sealing section. The closing section, the at least one joining section and the at least one sealing section can be optimized in each case with respect to the function thereof. The differing sections can advantageously have differing mechanical flexibility in each case.

The closing section can advantageously be mechanically stable and inflexible compared to the other sections. The mechanical stability of the end body, and thus of the entire filter element, can be improved in this way. The closing section can advantageously have a disk shape. Disks are flat and can cover the corresponding end face of the filter medium in a space-saving manner.

The flexibility of the at least one sealing section can advantageously be optimal for the sealing function, at least in a region that is seated against the tube-like connecting element when installed. In this way, the sealing function can be improved. The at least one sealing section can advantageously be ring-like or sleeve-shaped, in particularly in the shape of a cylinder jacket or the envelope of a cone. The at least one sealing section can advantageously surround the imaginary axis in a circumferentially closed manner.

The flexibility of the at least one joining section can advantageously be such that it allows a movement of the at least one sealing section relative to the closing section. In this way, tolerances can be compensated for. Furthermore, a position and/or an orientation of the at least one sealing section relative to the closing section can be easily changed. The at least one joining section can advantageously be ring-like or sleeve-shaped, in particular in the shape of a cylinder jacket or the envelope of a cone. The at least one joining section can advantageously surround the imaginary axis in a circumferentially closed manner.

Moreover, the one-piece end body can be prefabricated together with the closing section, the at least one joining section and the at least one sealing section. The at least one sealing section, together with the at least one joining section, can be captively connected to the closing section. The end body can thus be easily stored and transported. The at least one sealing section can advantageously be disposed on the closing section so that the at least one sealing section is easily positioned in the correct installation position on the filter element. In this way, the assembly complexity can be reduced. Moreover, no separate components, in particular separate seals, are required. The overall material expenditure can thus be reduced.

Advantageously, the at least one sealing section, the at least one joining section and/or the closing section can be made of the same material. The end body is thus easier to produce than is the case in particular with two-component parts. The flexibility of the at least one joining section can advantageously be achieved by appropriate shaping of the material. Advantageously, material thicknesses in the joining section can be accordingly thinner than in the closing section and/or in at least one sealing section.

The end body comprising the at least one sealing section, the closing section and the joining section can advantageously be made of plastic material. Plastic material is easy to shape. Plastic material can also be used to easily implement flexible sections. In addition, good sealing action can be generated with plastic material. Plastic material can flexibly adapt to corresponding sealing surfaces of the tube-like connecting element and seal with respect to the same.

The filter element can advantageously be a round filter element. The filter medium can advantageously be circumferentially closed. Advantageously, it can be pleated in a zig-zag or star-shaped manner. The round filter element can have a round or an oval cross-section or one that is curved in another manner. Instead of the round filter element, it is also possible to provide a filter element comprising a filter medium hollow body having an angular, in particular a square, rectangular or triangular, cross-section.

The central fluid opening in the end body can advantageously be connected to an inner chamber of the filter medium hollow body which is surrounded by the filter medium. When the filter element is installed, the tube-like connecting element of the filter can thus protrude through the fluid opening into the inner chamber of the filter medium hollow body. The connecting element can advantageously comprise at least one fluid channel and thus connect the inner chamber to an inlet or an outlet of the filter housing for the fluid.

The tube-like connecting element of the filter can advantageously be a connector or a center tube. The tube-like connecting element can advantageously be rigidly connected to the filter housing.

In an advantageous embodiment, the end body comprising the closing section, the at least one joining section and the at least one sealing section can be implemented as a blow-molded part. Complex shapes can be easily implemented for the end body by way of the blow-molding method. The end body is advantageously easy to produce from plastic material according to a blow-molding method.

In a further advantageous embodiment, the at least one sealing section can be axially inverted over the at least one joining section with respect to an axis of the sealing section. When the filter element is installed, the axis of the sealing section can advantageously be coaxial with respect to an axis of the central fluid opening in the end body. The axes can advantageously be coaxial with respect to the imaginary axis of the filter element.

The at least one joining section can advantageously be flexible to such a degree that inverting of the at least one sealing section is made possible. During production of the end body, a sealing surface of the sealing section can initially be implemented radially on the outside and easily accessible, and it can be inverted inward over a filter medium hollow body after the end body has been mounted. The sealing surface of the sealing section can thus be implemented better and more easily. The end body can be easily placed on the end face of the filter medium, and the sealing section can subsequently be inverted. The installation of the end body on the filter medium can thus be simplified further.

In a further advantageous embodiment, the at least one sealing section can comprise at least one sealing contour, at least on the circumferential side thereof facing the tube-like connecting element when the filter element is installed in the filter. The sealing contour can advantageously have an undulated profile, the undulations of which extend circumferentially with respect to the at least one sealing section. For this purpose, circumferentially extending undulation peaks alternate in each case with corresponding circumferentially extending undulation troughs. The sealing contour allows improved flexibility of the at least one sealing section. In this way, the shape of the at least one sealing section can be better adapted to the shape of the radially outer circumferential side of the tube-like connecting element. The sealing action can thus be improved further. Since the circumferential side of the sealing section during production can initially be disposed radially on the outside prior to the sealing section being inverted, the sealing contour can be implemented more easily. After the sealing section has been inverted, the sealing contour can be disposed on the radially inner circumferential side facing a corresponding sealing surface of the tube-like connecting element.

In a further advantageous embodiment, the at least one sealing section can be seated against at least one support section of the filter element which extends at least over a portion of of the circumference with respect to the fluid opening, in particular of a support tube and/or the end body, which, when the filter element is installed, can be located on the side of the at least one sealing section located radially opposite the tube-like connecting element. The at least one support section of the filter element can form a counter surface for the at least one sealing section. The at least one support section can prevent the at least one sealing section from expanding too far in the radial direction when the tube-like connecting element is inserted. The sealing function can thus be improved further. The at least one sealing section can thus be positioned and held better in the filter element.

The support section can advantageously be integrally connected to the end body. It can also be part of the end body. The at least one support section can advantageously be integrally connected to the other sections of the end body. It can advantageously be made of the same material as the other sections of the end body. The support section can advantageously have a mechanically more stable design than the at least one joining section, in particular due to corresponding shaping and/or material thickness. The at least one support section can advantageously have a sleeve-like shape, in particular the shape of a cylinder jacket or the envelope of a cone. The at least one support section can advantageously be connected to the closing section on one end face, and to the at least one joining section on the other end face. The at least one sealing section can thus be inverted over the joining section at the end face of the at least one support section which faces away from the closing section. The at least one sealing section can thus be disposed in an inner chamber of the at least one support section and can be supported on the radially inner circumferential side of the at least one support section.

As an alternative, the at least one support section can be disposed as a separate component on the end body. This can advantageously be an axial extension of a corresponding support tube of the filter element, which extends through the central fluid opening of the end body.

In a further advantageous embodiment, the at least one sealing section can be disposed in an inner chamber of the filter medium hollow body. The at least one sealing section can thus be disposed safely and protected. Moreover, the at least one sealing section can be disposed in a space-saving manner in the inner chamber. The at least one sealing section can advantageously be seated against a radially inner circumferential side of a support tube of the filter element. The at least one sealing section can thus be held at a distance from the radially inner circumferential side of the filter medium in the radial direction. In this way, covering of the active filter surface by the at least one sealing section can be reduced. The at least one sealing section can advantageously be disposed in the inner chamber of the filter medium hollow body simply by inverting it.

In a further advantageous embodiment, the at least one sealing section can be disposed on an outer side of the end body facing away from the filter medium hollow body. In this way, covering of the filter medium by the at least one sealing section can be reduced. In this way, an active filter surface can be increased. A potentially present support section on which the at least one sealing section can be supported can advantageously likewise be disposed on the outer side of the end body.

The object is further achieved according to the invention by the method in that the at least one sealing section is integrally connected to the closing section by way of at least one flexible joining section.

The advantages and features described above in connection with the filter element according to the invention and the advantageous embodiments thereof apply in corresponding fashion to the method according to the invention and the advantageous embodiments thereof, and vice versa. According to the invention, the end body is easily implemented in one piece with the at least one sealing section, the closing section and the at least one joining section. The sections can thus be collectively prefabricated, stored, transport and installed. The at least one sealing section can thus be easily captively connected to the closing section. The at least one sealing section can thus also be easily and precisely positioned on the filter medium hollow body. Advantageously, the end body can be produced from plastic material according to a blow-molding method.

In an advantageous embodiment of the method, the at least one sealing section can be axially inverted over the at least one joining section with respect to an axis of the sealing section. In this way, a corresponding sealing surface of the sealing section can initially be implemented radially on the outside in an easily accessible manner. When the filter element is installed and assembled, the at least one sealing section can be appropriately inverted, so that the corresponding sealing surface is located on the radially inner circumferential side. The axis of the sealing section can advantageously coincide with the imaginary axis of the filter element.

In a further advantageous embodiment of the method, the at least one sealing section can be provided with at least one sealing contour at least on the radially outer circumferential side thereof, the sealing contour facing the tube-like connecting element after the at least one sealing section has been inverted, when the filter element is installed in the filter. The at least one sealing contour can be easily implemented on the radially outer circumferential side. With the aid of the sealing contour, a sealing function with respect to the tube-like connecting element can be improved.

BRIEF DESCRIPTION OF THE DRAWINGS

Additional advantages, features and details of the invention will be apparent from the description provided hereafter, which describes exemplary embodiments of the invention in more detail based on the drawings. A person skilled in the art will expediently also individually consider the features that are disclosed in combination in the drawings, the description and the claims and combine them to form useful further combinations. The schematic figures show:

FIG. 1 is an isometric illustration of a round filter element of an air filter of an internal combustion engine of a motor vehicle according to a first exemplary embodiment, comprising a filter bellows, on the one end face of which a connecting end plate having a connecting opening and a sealing section for the connecting opening are attached, wherein the sealing section is disposed in an inner chamber of the filter bellows;

FIG. 2 shows a detailed view of the connecting end plate of FIG. 1 in a pre-assembled state prior to installation on the filter bellows;

FIG. 3 shows a longitudinal sectional view of the round filter element of FIG. 1;

FIG. 4 shows a longitudinal sectional view of the connecting end plate in the pre-assembled state of FIG. 2.

In the figures, identical components are denoted by the same reference numerals.

DETAILED DESCRIPTION OF THE INVENTION

Figure 1A:
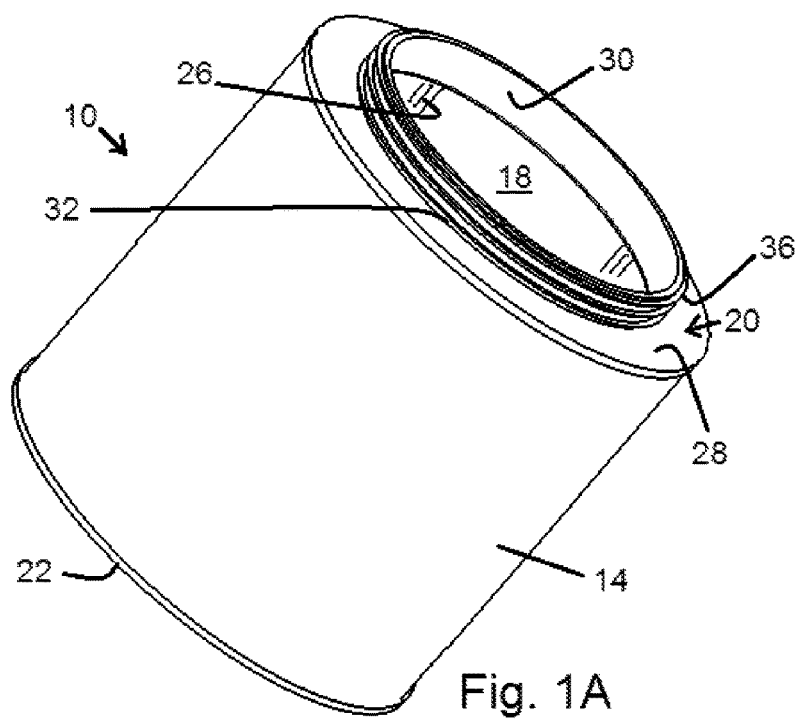
FIG. 1A shows the connecting end plate of FIG. 1 in a first state in which the annular sealing section is arranged at and projects axially outwardly from the second face of the annular closing section of the connecting end plate of the filter element.
Figure 1B:
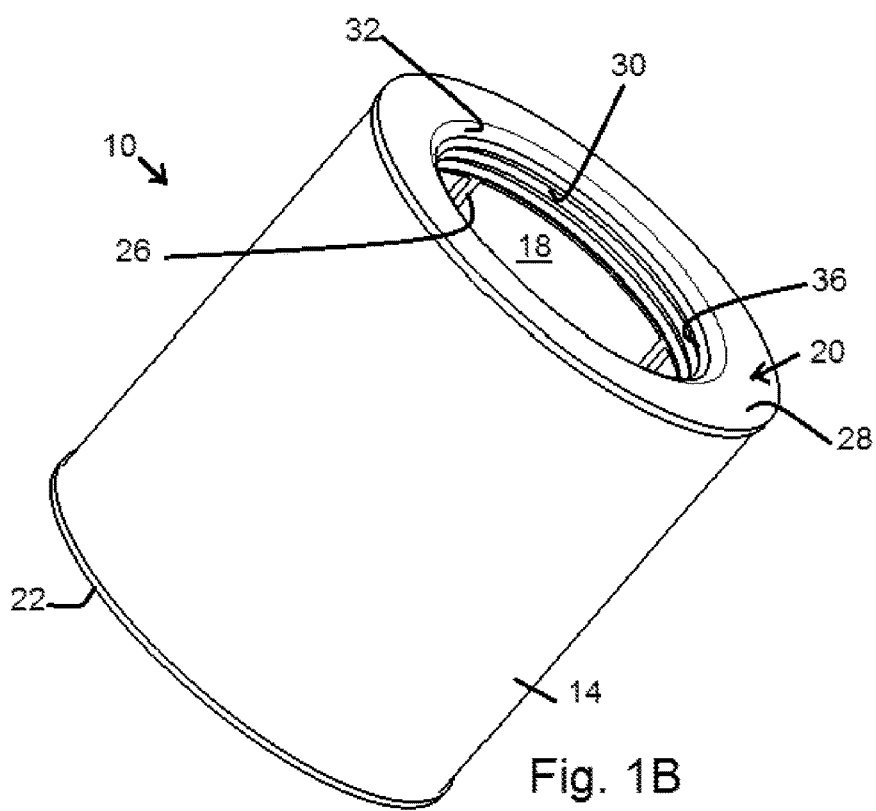
FIG. 1B shows the connecting end plate of FIG. 1 in a second state in which the annular sealing section is inverted through the central fluid opening of the connecting end plate and now is arranged at and projects axially from the connecting end plate into the interior of the filter medium hollow body.

FIGS. 1 and 3 show a filter element 10 of an air filter of an internal combustion engine of a motor vehicle. The filter element 10 can be disposed replaceably in a filter housing (not shown) of the air filter, so that it sealingly separates an air inlet of the filter housing from an air outlet.

The filter element 10 is designed as a round filter element having a round cross-section. The filter element 10 comprises a filter bellows 12 made of a circumferentially closed filter medium 14 that is pleated in a zigzag manner. The filter medium 14 can be a non-woven filter, for example. In the overall, the filter element 10 has a coaxial design with respect to an imaginary axis 16. The radially inner circumferential sides of the filter bellows 12 and the radially outer circumferential sides are each located on an imaginary coaxial cylinder jacket with respect to the axis 16. The filter bellows 12 surrounds an inner chamber 18 of the filter element 10 in a circumferentially closed manner.

A connecting end plate 20, which is sealingly connected to the filter medium 14, is disposed on an end face of the filter bellows 12. A counter end plate 22 is disposed on the other end face and likewise sealingly connected to the filter medium 14. The connecting end plate 20 and the counter end plate 22 are both made of plastic material. They are each joined to the filter medium 14 by way of an adhesive. As an alternative, the connecting end plate 20 and the counter end plate 22 could also be melted in each case and, for joining, the filter medium 14 can be pressed into the melted plates 20, 22.

The counter end plate 22 is entirely closed and closes the inner chamber 18 at the corresponding end face of the filter bellows 12.

The connecting end plate 20 has a central opening 24, which is coaxial with respect to the axis 16. The diameter of the opening 24 is slightly smaller than the radially inner diameter of the filter bellows 12 and a diameter of the inner chamber 18.

A grid-shaped support tube 26 is disposed coaxially with respect to the axis 16 in the inner chamber 18 of the filter bellows 12. The support tube 26 is likewise made of plastic material, or also metal. The radially outer circumferential sides thereof are seated against the radially inner circumferential sides of the filter bellows 12, thereby supporting the same. The end faces of the support tube 26 are connected in each case to the connecting end plate 20 and the counter end plate 22. The support tube 26 as a whole allows air to pass through on the circumferential side. The support tube 26 is composed of a plurality of circumferentially extending circumferential struts, which are integrally connected by way of a plurality of axially extending axial struts.

The connecting end plate 20, which is shown in FIGS. 2 and 4 in a pre-assembled state before installation on the filter bellows 12, comprises a closing section 28, a sealing section 30 and a flexible joining section 32, which are integrally connected to each other. The connecting end plate 20 comprising the sections 28, 30 and 32 is produced by way of a blow-molding method. It is made of a single plastic material.

The closing section 28 has the shape of a round annular disk extending radially with respect to the axis 16. The closing section 28 has the opening 24. An end face thereof is connected to the end face of the filter bellows 12.

The sealing section 30 has the shape of a cylinder jacket section. When the connecting end plate 20 is installed on the filter bellows 12, the sealing section 30 is coaxially disposed in the inner chamber 18 with respect to the axis 16. When installed, an axis of the sealing section 30 coincides with the axis 16 and, for the sake of improved clarity, is also denoted by reference numeral 16 in FIGS. 2 and 4.

The sealing section 30 is connected to the radially inner circumferential side of the closing section 28 by way of the flexible joining section 32. The joining section 32 and the sealing section 30 are each circumferentially closed with respect to the axis 16. A radially outer circumferential side of the sealing section 30 is seated against the radially inner circumferential side of the support tube 26 when the connecting end plate 20 is installed. The support tube 26 thus supports the sealing section 30, thus forming a counter surface.

The circumferential side of the sealing section 30, which is the radially inner side when the connecting end plate 20 is installed, comprises a sealing contour 34. The sealing contour 34 has a saw tooth-like profile. The sealing contour 34 comprises a plurality of ridges 36, which extend circumferentially with respect to the axis 16 and form the teeth of the saw tooth-like profile. The ridges 36 have a certain elasticity, which allows a sealing function with respect to a connector 38, which is indicated with dotted lines in FIG. 3, or a center tube of the filter housing. When the connecting end plate 20 is installed, the flanks of the ridges 36 facing away from the inner chamber 18 extend obliquely with respect to the axis 16, so that an insertion of the connector 38 into the opening 24, which is to say into the sealing section 30, is simplified. The opposing flanks of the ridges 36 facing the inner chamber 18 extend radially with respect to the axis 16, so that a removal of the connector 38 is made more difficult.

In the pre-assembled state of the connecting end plate 20 prior to installation on the filter bellows 12, the sealing section 30 is located on the first face 52 of the outer side of the closing section 28, which is located opposite the filter bellows 12 which is attached to the second face 54 of the closing section 28 in the final installed state. In the pre-assembled state, the sealing contour 34 is disposed on the radially outer circumferential side of the sealing section 30. The sealing contour 36 is thus easy to implement according to the blow-molding method. The elasticity of the joining section 32 allows the sealing section 30 to be inverted from the pre-assembled state into the final installed state. During operation of the air filter, the air that is to be filtered flows through the filter bel-lows 12 from radially outward to radially inward. The air flow is indicated in FIG. 3 by arrows 40. The connector 38 of the filter housing is an outlet connector in the embodiment shown.

To produce the filter element 10, initially the filter bellows 12, the connecting end plate 20, the counter end plate 22 and the support tube 26 are prefabricated as separate components.

The support tube 26 is disposed in the inner chamber 18 of the filter bellows 12. The connecting end plate 20 and the counter end plate 22 are disposed on the end faces of the filter bellows 12 by means of interposed adhesive. Thereafter, the sealing section 30 is inverted axially with respect to the axis 16 over the joining section 32 into the inner chamber 18 of the filter bellows 12 out of the pre-assembled state on the outer side of the connecting end plate 20. After the adhesive has dried, the filter element 10 is ready for use.

For installation in the filter housing, the filter element 10 is placed onto the connector 38 with the connecting end plate 20 first, wherein the connector extends through the opening 24 into the sealing section 30 into the inner chamber 18. The sealing contour 34 is then sealingly seated against the radially outer circumferential side of the connector 38.

Figure 5:
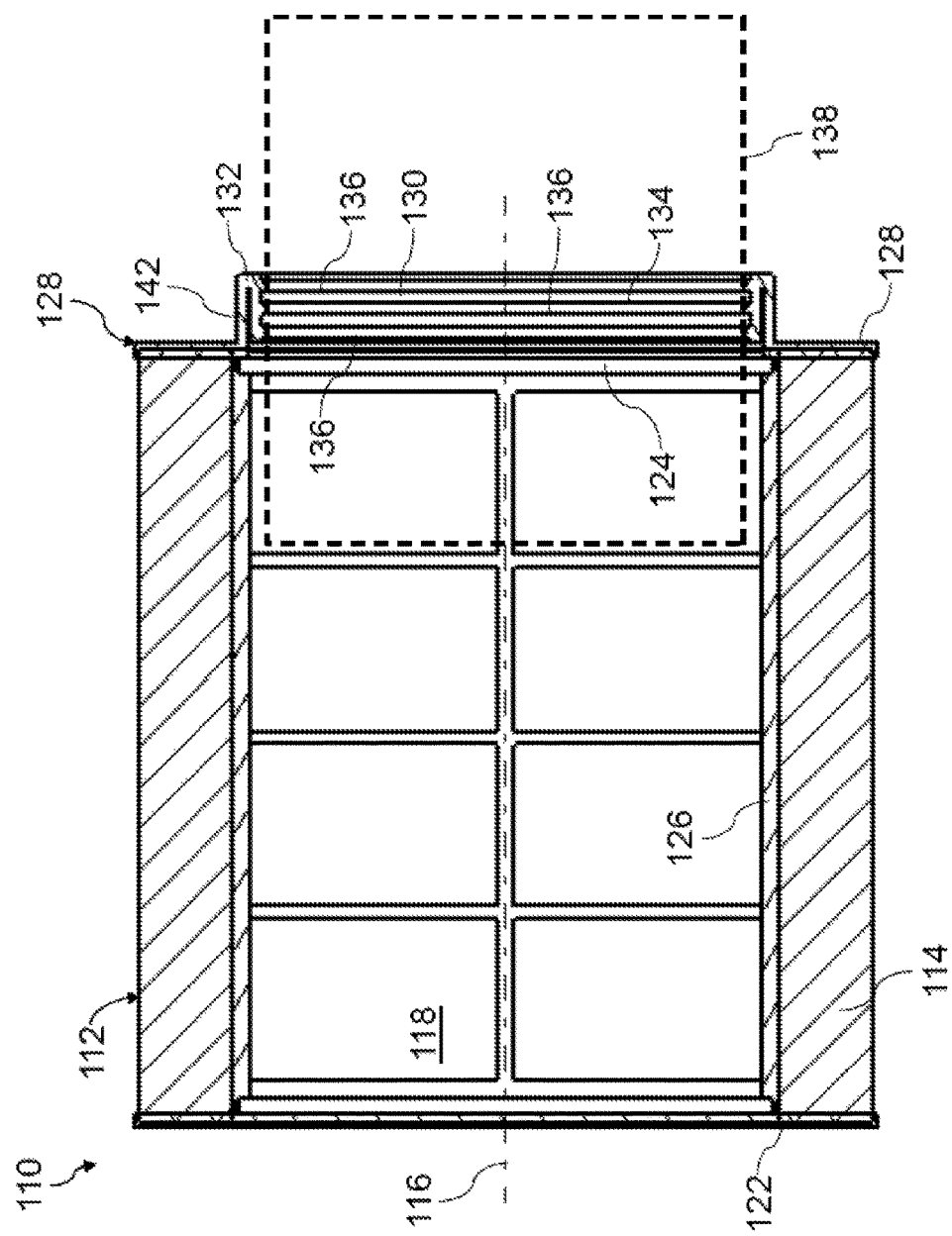
FIG. 5 shows a longitudinal sectional view of a round filter element according to a second exemplary embodiment, which is similar to the round filter element of FIGS. 1 and 3, in which the sealing section is disposed on the outer side of the connecting end plate.

FIG. 5 shows a second exemplary embodiment of a filter element 110. The elements that are similar to those of the first exemplary embodiment from FIGS. 1 to 4 are denoted by the same reference numerals plus 100.

The filter element 110 differs from the filter element 10 according to the first exemplary embodiment from FIGS. 1 to 4 in that a sealing section 130 is disposed on the outer side of the connecting end plate 20, instead of in the inner chamber 18.

A support section 142 is disposed between the joining section 132 and the closing section 128. The support section 142 has the shape of a cylinder jacket that is coaxial with respect to the axis 116. It is mechanically stable. At one end face, the support section 142 is integrally connected to the closing section 128, and at the other end face, it is integrally connected to the sealing section 130. The support section 142 is located on the outer side of the closing section 128 facing away from the filter bellows 12. The axial extension of this section corresponds approximately to the axial extension of the sealing section 130. When installed, the radially outer circumferential side of the sealing section 130 is seated against the radially inner circumferential side of the support section 142. The support section 142 thus forms a counter surface for the sealing section 130 against the connector 138 of the filter housing.

The sealing section 130 is also inverted axially over the joining section 132 with respect to the axis 16 in the second exemplary embodiment. In the pre-assembled state of the connecting end plate 120, which is not shown in the figures, the sealing contour 134 is seated against the radially outer circumferential side of the sealing section 130, analogously to the first exemplary embodiment, as shown in FIG. 4. The sealing section 130 is then not disposed inside the support section 142, but in the axial direction next to the same on the side located opposite the closing section 128.

The filter element 110 is installed in the filter housing in a manner corresponding to the first exemplary embodiment of the filter element 10.

In all the above-described exemplary embodiments of a filter element 10; 110 and of a method for producing a filter element 10; 110, the following modifications are possible, among other things.

The invention is not limited to filter elements 10; 110 of air filters of motor vehicles. Rather, it can also be used in other filter elements, such as for fuel, oil, water or a urea solution. The filter can also be employed outside of motor vehicles, such as for industrial engines.

The filter element 10; 110 can be also disposed in a fixed manner, instead of replaceably, in the filter housing.

Instead of being a round filter element, the filter element 10; 110 can also be implemented as a different kind of filter element comprising a filter bellows designed as a hollow body. For example, the round filter element can have an oval cross-section instead of a round cross-section. It can also be a filter element having an angular cross-section. Instead of the filter medium being pleated in a zigzag-shaped manner, it is also possible to use a filter medium that is circumferentially closed in another manner, such as a foamed filter medium.

Air can flow through the filter bellows 12; 112 from radially inward to radially outward, instead of from radially outward to radially inward. The connector 38; 138 in this case is an inlet connector.

We claim:

1. A filter element of a filter for fluid of a motor vehicle, comprising:
    a filter medium hollow body of a filter medium;
    wherein the filter medium hollow body is circumferentially closed radially surrounding an imaginary axis
    wherein at least one end face, comprises an end body, which includes
        an annular closing section having
            a first face arranged directly on and sealingly connected directly onto the filter medium on an axial end of the hollow body,
            a second face on a axially opposite side of the annular closing section from the first face;
        wherein the annular closing section has a central fluid opening extending through the annular closing section from the first face to the opposing second face of the annular closing section and into which a tube-like connecting element of the filter can be inserted; and
        a circumferentially closed annular sealing section arranged on the annular closing section on an outer circumference of the central fluid opening and surrounding the central fluid opening,
    at least one flexible joining section circumferentially surrounding the central fluid opening and connecting the circumferentially closed annular sealing section to the annular closing section;
    wherein the annular sealing section is integrally connected to the annular closing section by the at least one flexible joining section such that the annular sealing section is invertable through the central fluid opening from:
        a first state in which the annular sealing section is arranged at and projects axially outwardly from the second face of the annular closing section of the filter element, to
        a second state in which the annular sealing section is inverted through the central fluid opening and now is arranged at and projects axially from the first face of the annular closing section of the filter element, into the an inner chamber of the filter medium hollow body;
    wherein the circumferentially closed annular sealing section is configured for circumferentially sealing the central fluid opening with respect to the tube-like connecting element of the filter, when in the second state.

2. The filter element according to claim 1, wherein
    the end body having the annular closing section, the at least one flexible joining section and the circumferentially closed annular sealing section are formed together, forming a unitary one-piece blow-molded part.

3. The filter element according to claim 1, wherein
    the circumferentially closed annular sealing section can be axially inverted over the at least one joining section with respect to an axis of the sealing section.

4. The filter element according to claim 1, wherein
    the circumferentially closed annular sealing section:
        when in the first state, includes at least one sealing contour formed as an projecting ridge on a radial exterior of the circumferentially closed annular sealing section; and
        when in the second state, the at least one sealing contour is arranged on a radial interior of the circumferentially closed annular sealing section, the at least one sealing contour facing the tube-like connecting element.

5. The filter element according to claim 1, wherein
    when in the second state, the circumferentially closed annular sealing section is seated against at least one support section of the filter element which extends at least over a portion of the circumference with respect to the fluid opening of a support tube and/or the end body;
    wherein, when in the second state, the at least one support section is located on the side of the circumferentially closed annular sealing section located radially opposite the tube-like connecting element.

6. A filter element according to claim 1,
    wherein, when in the second state, the circumferentially closed annular sealing section is disposed in the inner chamber of the filter medium hollow body.

* * * * *